No. 895,417. PATENTED AUG. 11, 1908.
J. L. BOYER.
SHOVEL ATTACHMENT FOR DISK CULTIVATORS.
APPLICATION FILED DEC. 9, 1907.

Witnesses:
A. A. Olson
I. K. S. Austin

Inventor:
Jonathan L. Boyer.
by Joshua R. H. Potts
Atty.

UNITED STATES PATENT OFFICE.

JONATHAN L. BOYER, OF ELVASTON, ILLINOIS.

SHOVEL ATTACHMENT FOR DISK CULTIVATORS.

No. 895,417.

Specification of Letters Patent.

Patented Aug. 11, 1908.

Application filed December 9, 1907. Serial No. 405,669.

*To all whom it may concern:*

Be it known that I, JONATHAN L. BOYER, a citizen of the United States, residing at Elvaston, county of Hancock, and State of Illinois, have invented certain new and useful Improvements in Shovel Attachments for Disk Cultivators, of which the following is a specification.

My invention relates to disk cultivators and particularly to attachments for disk cultivators.

The object of my invention is to provide shovel attachment for disk cultivators which will adapt the cultivator for working close to young corn or other small plants without disturbing them or tearing the growing roots.

Other objects will appear hereinafter.

My invention consists generally in a shovel attachment for disk cultivators adapted to replace the inner disk of each gang.

My invention further consists in means for adjusting the shovel as desired.

My invention further consists in various details of construction and arrangements of parts all as will be hereinafter fully described and particularly pointed out in the claims.

Figure 1:
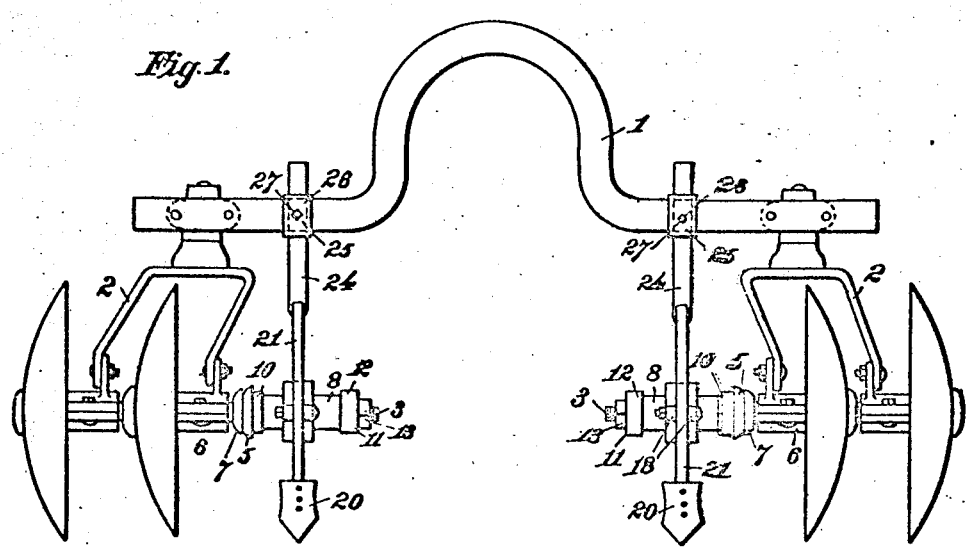
Figure 2:
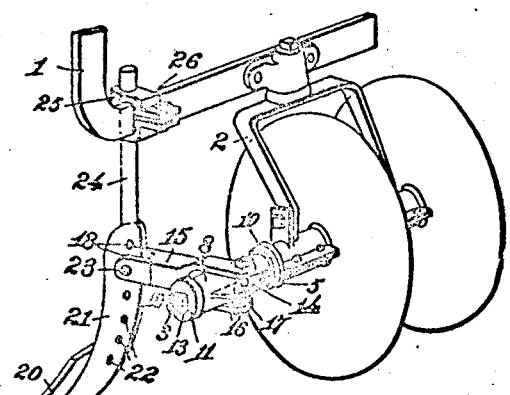
Figure 3:
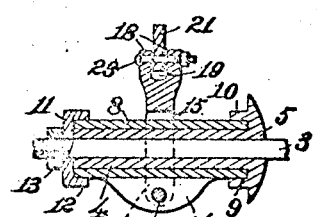

My invention will be more readily understood by reference to the accompanying drawings forming a part of this specification and in which, Figure 1 is a front elevation of a portion of a disk cultivator equipped with the shovel attachments embodying my invention in its preferred form, Fig. 2 is a perspective view of one of the gangs equipped with the shovel attachment, and Fig. 3 is a detail section.

Referring to the drawings, 1 indicates the usual arch or cross bar of a disk cultivator, upon each side of which is mounted the usual gang, 2. Each gang of a disk cultivator usually comprises three disks and it is the object of my invention to replace the inner disk of each gang by a shovel attachment. In working young corn or other small plants, with an ordinary disk cultivator, the ground cannot be worked sufficiently close to the plants without disturbing them or tearing the tender growing roots. By replacing the inner disks with a shovel, the ground may be worked close to the young plants without detriment.

In carrying out my invention, I remove the inner disk of each gang and substitute a longer bolt, 3 for the one upon which the disks are mounted and upon the end of the bolt secure the shovel attachments. The shovel attachment comprises a sleeve mounted on the bolt, 3 and adapted to rotate therewith, a non-rotary sleeve mounted thereon and having a flange or lug formed upon one side thereof, a clevis secured to the flange or lug and having a bifurcated end to which the shank of the shovel is adjustably secured and a suitable clamp arranged upon the arch or cross member of the frame to receive the end of the shank.

4 indicates the rotary sleeve mounted upon the bolt. This is provided with a head, 5 which bears against the box 6 of the gang, or against the end of the bearing spool, 7. Upon the sleeve, 4 is mounted a second or non-rotary sleeve, 8, the inner end of which enters an annular groove, 9 on the head, 5 formed between the sleeve, 4 and an annular, flange, 10.

11 is a cap having a flange, 12 which surrounds the opposite end of the sleeve and 13 a nut for securing the parts together. The sleeve, 4 is slightly longer than the sleeve, 8 so that when the nut, 13 binds the cap, 11 firmly against the end of the sleeve, 4, the sleeve 4 is free to rotate within the sleeve, 8. The flanges, 10 and 12 prevent dust and grit from entering the bearings. Formed upon the sleeve, 8 is a lug or flange, 14 by means of which the shovel attaching clevis is secured thereto.

15 indicates the clevis. This is provided with a pair of arms, 16 which receive the sleeve between them. A bolt, 17 passing through suitable holes in the end of the arm, 16 and the lug, 14 secures the clevis to the sleeve. The lug, 14 is arranged upon the rear of the sleeve, 8 and the clevis extends forwardly therefrom terminating at its forward end in a pair of lugs, 18 forming a vertically disposed groove, 19 between them, to receive the shank of the shovel.

20 indicates the shovel secured to the lower end of the shank, 21. The shank, 21 comprises a flat plate adapted to enter the groove, 19 and is provided with a plurality of holes, 22 to receive a bolt, 23 extending through the lugs, 18. It is obvious that the shank is readily adjustable in the clevis to raise or lower the shovel as desired. The shank of the shovel terminates at its upper end in a stem, 24. This is preferably cylindrical and is arranged to slide vertically in a sleeve, 25 formed upon a clamp, 26 secured to the cross member, 1 of the frame.

27 indicates a set screw in the sleeve adapted to impinge against the stem, 24 holding the shovel firmly in position.

The device herein described is of simple construction, of low cost to manufacture and may be readily and quickly attached to the cultivator. To attach the device the inner disk is removed and the long bolt, 3 substituted for the usual one. The sleeves bearing the clevis are then slipped in place together with the cap, 11 and secured in position by the nut, 13. The stem of the shovel shank is then slipped into the sleeve, 25 and the shank secured to the clevis. After the shovel is in proper position, the bolt, or set screw, 27 is tightened.

Having described my invention what I claim as new and desire to secure by Letters Patent is:

1. In a disk cultivator, a disk gang in combination with a shovel attachment adapted to be secured upon said gang to replace one of the disks, and means secured to the frame of the cultivator for bracing the shovel attachment, substantially as described.

2. In a disk cultivator, a disk gang comprising the spindle bolt and a plurality of disks, in combination with a rotary sleeve mounted on said bolt, a non-rotary sleeve mounted thereon and a bifurcated clevis astride of said sleeve and affording means for attaching a shovel thereto, substantially as described.

3. In a disk cultivator, a frame and a gang comprising a spindle bolt and a plurality of disks, in combination with a sleeve mounted upon the spindle bolt, a clevis secured to said sleeve, a shovel secured to said clevis and means on said frame for bracing said shovel, substantially as described.

4. In a disk cultivator, a frame and a gang comprising a spindle bolt and a plurality of disks, in combination with a sleeve mounted upon the spindle bolt, a clevis secured to said sleeve, a shovel having a shank adjustably secured to said clevis and means on said frame for engaging said shank to brace the shovel, substantially as described.

5. In a disk cultivator a frame and a gang comprising a spindle bolt and a plurality of disks in combination with a sleeve mounted upon said bolt, a clevis secured to said sleeve, a shovel having a shank adjustably secured to said clevis, an extension on said shank and means on the frame of the cultivator for engaging said extension, substantially as described.

In testimony whereof I have signed my name to this specification in the presence of two subscribing witnesses.

JONATHAN L. BOYER.

Witnesses:
GEORGE H. WHITE,
C. D. HARRISON.